Figure 5:
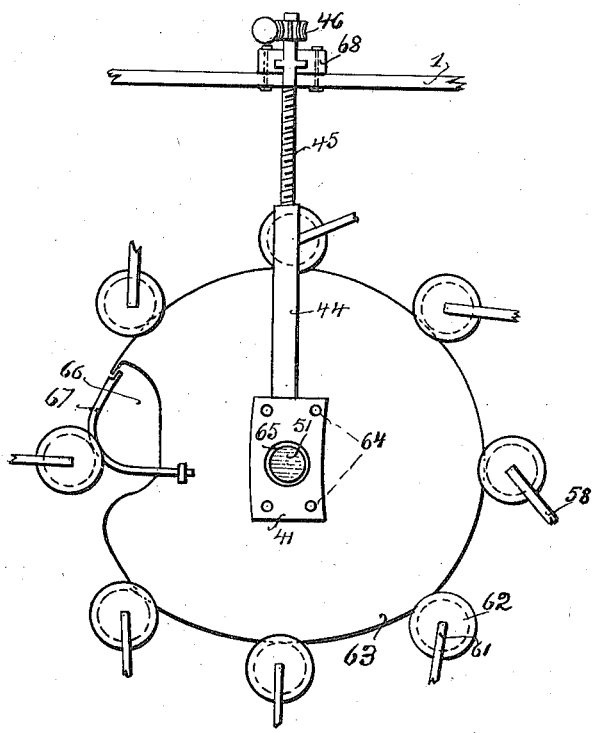

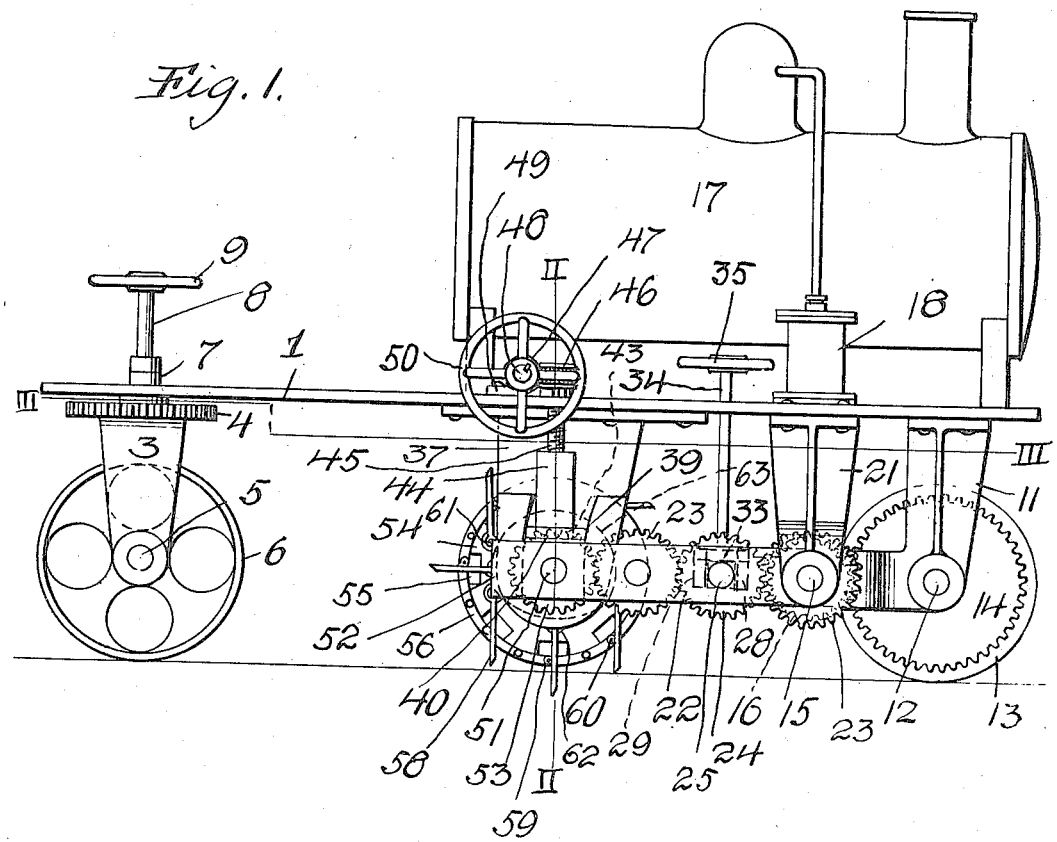

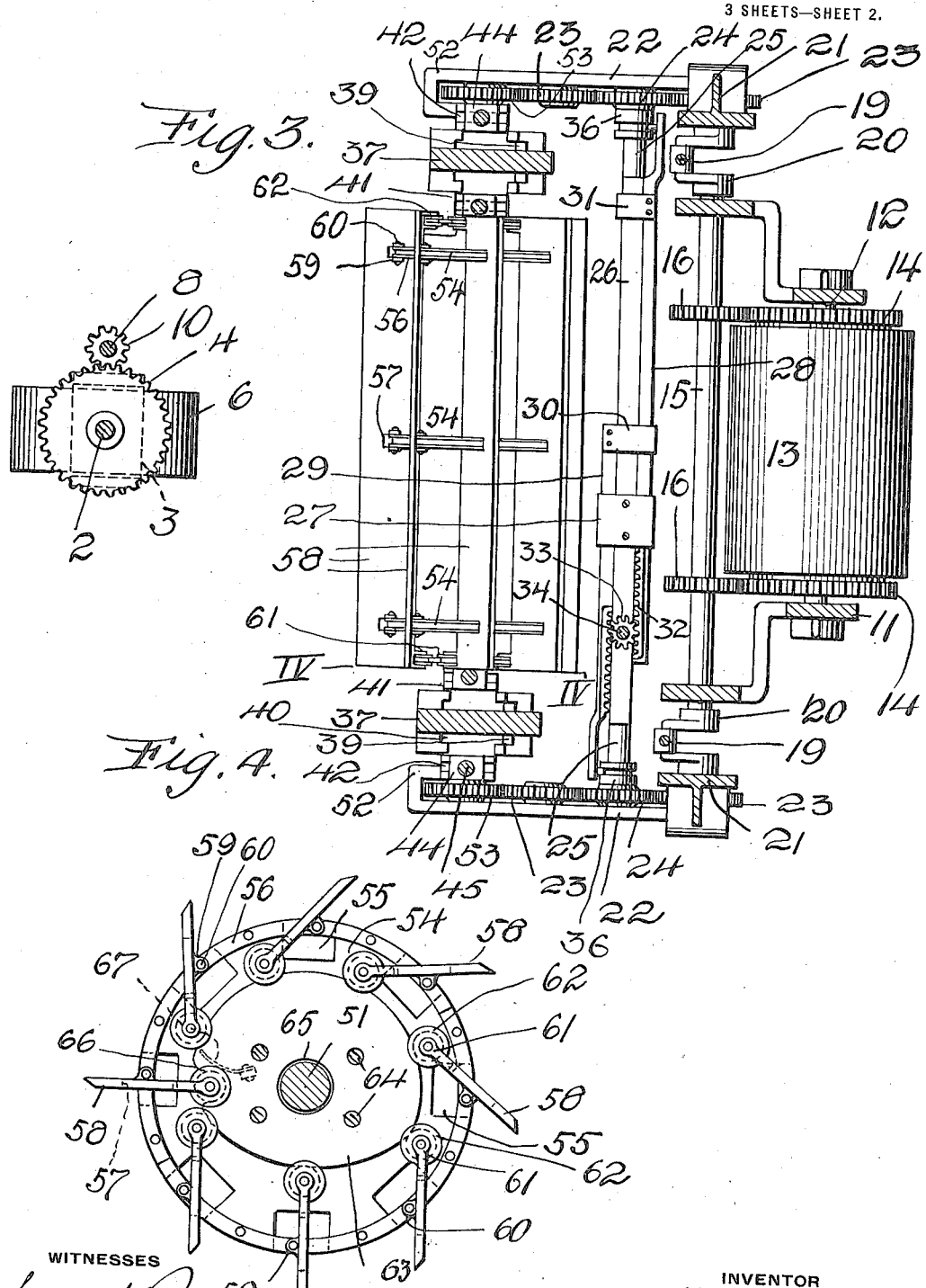

H. STELZMANN.
PLOWING MACHINE.
APPLICATION FILED APR. 17, 1913.

1,137,031.

Patented Apr. 27, 1915.
3 SHEETS—SHEET 3.

@@@# UNITED STATES PATENT OFFICE.

HENRY STELZMANN, OF SEWICKLEY, PENNSYLVANIA.

PLOWING-MACHINE.

1,137,031.

Specification of Letters Patent. Patented Apr. 27, 1915.

Application filed April 17, 1913. Serial No. 761,834.

*To all whom it may concern:*

Be it known that I, HENRY STELZMANN, a citizen of the United States of America, residing at Sewickley, in the county of Allegheny and State of Pennsylvania, have invented certain new and useful Improvements in Plowing-Machines, of which the following is a specification, reference being had therein to the accompanying drawing.

This invention relates to plowing machines, and the primary object of my invention is to provide a motor plow than can be advantageously used for plowing and otherwise disintegrating large areas of ground, the machine being especially designed for cultivating western lands.

Another object of this invention is to provide a motor plow for expeditiously and economically tilling the soil, the plow having a bladed soil disintegrator wherein the blades are arranged to assume various angles that are conducive to an easy and uninterrupted movement of the machine over the soil.

A further object of this invention is to provide a motor plow with a roller and an adjustable disintegrator which can be elevated and thrown out of operation whereby the machine, through the medium of the roller can be moved over ground that is not to be tilled.

A still further object of this invention is to provide a strong and durable motor plow that is easy to control and highly efficient for expediting the cultivation of soil.

With the above and other objects in view the invention resides in the novel construction, combination and arrangement of parts to be hereinafter specifically described and then claimed.

Reference will now be had to the drawings, wherein:—

Figure 1 is a side elevation of the plowing machine, Fig. 2 is a cross sectional view taken on the line II—II of Fig. 1, Fig. 3 is a horizontal sectional view of the machine taken on the line III—III of Fig. 1, Fig. 4 is an enlarged cross sectional view taken on the line IV—IV of Fig. 3, and Fig. 5 is an enlarged view of the cams represented in Fig. 4, showing more distinctly the contour of the cams which as will be herein explained determines the movement of the blades of the disintegrator.

Further describing my invention in detail with reference to the accompanying drawings, wherein like numerals denote corresponding parts throughout: 1 denotes a platform and swiveled in the rear end of said platform is the spindle 2 of a yoke 3. The upper end of the yoke 3 has a horizontal gear wheel 4 and journaled in the lower end of said yoke is the axle 5 of a steering wheel 6. Adjacent to the spindle 2 the platform 1 has a bearing 7 for a steering shaft of post 8. The upper end of the shaft has a hand wheel 9 and the lower end of said shaft has a small gear wheel 10 meshing with the large gear wheel 4. By rotating the hand wheel 9 the steering wheel 6 can be shifted to guide the machine in a desired direction.

11 denotes hangers carried by the front end of the platform 1, said hangers being Z-shaped in cross section. The front ends of the hangers support the axle 12 of a roller 13 and mounted upon said axle, at the ends of said roller and adapted to rotate with said roller are large gear wheels 14.

Journaled in the rear ends of the hangers 11 is a transverse revoluble crank shaft 15 and mounted upon said shaft are small gear wheels 16 that mesh with the large gear wheels 14.

17 denotes a steam engine or other source of power located upon the forward end of the platform 1, said engine having cylinders 18 for vertically reciprocating pitmen 19 that are connected to the crank portions 20 of the shaft 15.

21 denotes depending bearings carried by the platform 1 adjacent to the rear ends of the hangers and the ends of the shaft 15 extend into said bearings.

Pivotally mounted upon the ends of the shaft 15, between the hangers 11 and the bearings 21 are side frames 22 supporting a train of gear wheels 23 and 24, the latter being slidably and rotatably mounted upon the ends of a shaft 25 mounted in the side frames 22. The shaft 25, intermediate the ends thereof, has a rectangular portion 26 provided with a housing 27 in which is slidably mounted clutch bars 28 and 29. The end of the bar 29 has a strap 30 surrounding the shaft 25 and the clutch bar 28, and the clutch bar 28 has a strap 31 surrounding the shaft 25. The clutch bars are provided with racks 32 and meshing with said racks is a pinion 33 mounted upon the lower end of a vertical shaft 34 that is rotatably mounted upon the shaft 25 and rotatably mounted in the platform 1, said shaft having the upper end thereof provided with a hand wheel 35. The outer ends of the clutch bars 28 and 29 loosely engage in the hubs 36 of the gear wheels 24, and by rotating the shaft 34 the gear wheels 24 can be shifted out of mesh with the train of gears, whereby the shaft 15 can be revolved independent of the train of gears.

The reference numerals 37 denote guide-keepers carried by the platform formed at the sides thereof and in proximity to the rear ends of the pivoted side frames 22. The guide-keepers 37 are slotted, as at 38 and the sides of the guide-keepers are provided with curved guides 39 for the tongues 40 of bearing blocks 41. The upper ends of the bearing blocks 41 have dovetailed grooves 42 for the tongues 43 of supports 44. Screwed into the upper ends of the supports 44 are screws 45 that extend through the platform 1. These screws are mounted in the platform so that they rotate but are otherwise stationary in the platform 1 and they are provided with pinions 46 meshing with worms 47 mounted upon a transverse shaft 48, journaled in bearings 49, carried by the platform 1. The ends of the shaft 48 are provided with hand wheels 50 whereby said shaft can be revolved to rotate the screws 45 and elevate the supports 44 and the bearing blocks 41 carried thereby.

51 denotes a transverse shaft revolubly mounted in the bearing blocks 41 and in the ends of the side frames 22, said frames having yokes 52 formed integral with the outer bearing blocks 41. Mounted upon the shaft 51 within the yokes 52 are gear wheels 53 forming part of the train of gears 23.

The reference numeral 54 denotes a plurality of disks mounted upon the shaft 51 and the peripheral edges of said disks are notched, as at 55. Secured to the sides of the peripheral edges of said disks are sectional bearing rings 56 and these rings extend through openings 57 provided therefor in blades 58. The blades 58, at the sides of the openings 57 have apertured lugs 59 that are pivotally connected to said rings, as at 60. The blades 58 have the outer edges thereof beveled and at the inner edges of said blades and at the ends thereof are sets of bearings 61 for revoluble grooved wheels 62. The wheels 62 are adapted to ride upon cams 63, secured, as at 64 to the inner bearing blocks 41, said cams having openings 65 providing clearance for the shaft 51. The cams 63 have recessed portions 66 into which the grooved wheels 62 can ride and adjacent to the recessed portions 66 of the cams are flat compression springs 67 carried by the inner sides of said cams, said springs retarding the movement of the wheels 62 sufficiently for the blades to assume a desired angle.

Operation: Assuming that the shaft 15 is revolved by the source of power located upon the platform 1, the machine can be moved in a desired direction by rotating the steering shaft or post 8. To place the rotary bladed disintegrator in operation it is only necessary to rotate the shaft 34 to place the gear wheels 24 in train whereby a rotary movement will be imparted to the shaft 51. It will therefore be observed that the elements 24 to 36 inclusive constitute a clutch mechanism or means for controlling the operation of the rotary disintegrator relatively to the propulsion means of the machine. By rotating either one of the hand wheels 50 the bearing blocks 41 can be elevated to raise and lower the shaft 51 and it is in this connection that the bearing blocks are guided by the pivoted side frames 22 and the guides 39. As the shaft 51 is revolved the blades 58 enter the soil and agitate and disintegrate the same to that extent that the soil is opened for aeration and the reception of a fertilizer. The arrangement of the contour of the cams 63 for guiding the grooved wheels 62 is such that the blades enter the ground at an acute angle to the radius of the disks and as the machine moves forward they gradually assume a position forming a straight line with the radius of the disks and leave the ground at a reversed angle, the change of the angle of the blades causing the ground to be more easily broken and turned over. The peripheral velocity of the disintegrator is much greater than that of the roller, but the specific ratio of speed is in any given case to be determined according to local conditions. The disintegrator blades are carried into the soil by the weight of the machine. Where the soil is difficult to penetrate, I propose a greater relative velocity for the disintegrator, that the blades may consequently cut narrower furrows. This is to be accomplished by varying the relative sizes of the wheels 23 and 24.

It is thought that the operation and utility of the machine will be apparent without further description and while in the drawings there is illustrated a preferred embodiment of the invention, it is to be understood that the structural elements are susceptible to such changes, as in the size, shape and manner of assemblage as fall within the scope of the appended claims.

What I claim is:—

1. In a plowing machine the combination of a carriage, a power-shaft mounted in said carriage a pair of extensible arms borne by said carriage, each consisting of two parts, screw-threaded into engagement one with the other, a pair of bearing-blocks borne on said extensible arms, a disintegrator mounted in said bearing blocks, and guides concentric with said power shaft controlling the movement of said bearing blocks in response to the extension movement of said arms.

2. In a plowing machine the combination of a carriage, a power shaft mounted in said carriage, a pair of arms pivoted in said carriage concentrically with said power shaft, a second and extensible pair of arms comprising telescopic sections, screws threaded one within the other mounted in said carriage, and a disintegrator articulated at opposite ends to one of each of said pairs of arms.

3. In a plowing machine the combination of a carriage, a pair of downwardly extending screw-threaded shafts rotatably mounted in said carriage, a pair of journal members each provided with correspondingly threaded recesses applied to the ends of said shafts, and a rotary disintegrator journaled at its opposite ends in the said pair of journal members.

In testimony whereof I affix my signature in the presence of two witnesses.

HENRY STELZMANN.

Witnesses:
MAX H. SROLOVITZ,
KATHERINE ERRETT.